United States Patent [19]

Sands et al.

[11] Patent Number: 5,435,179
[45] Date of Patent: Jul. 25, 1995

[54] THREE PIECE HANDWHEEL HAVING EXPANSION MECHANISM FOR METER BOX OR METER YOKE

[75] Inventors: Robert E. Sands, Shelbyville; Donald F. Mack, Jr., Lovington, both of Ill.

[73] Assignee: Mueller Co., Decatur, Ill.

[21] Appl. No.: 261,210

[22] Filed: Jun. 15, 1994

Related U.S. Application Data

[63] Continuation of Ser. No. 37,112, Mar. 25, 1993, abandoned.

[51] Int. Cl.$^6$ ............................................. G01F 15/18
[52] U.S. Cl. ............................................. 73/201; 73/273; 285/31; 285/32; 285/302
[58] Field of Search ............ 73/201, 273; 285/31, 285/32, 302

[56] References Cited

U.S. PATENT DOCUMENTS

| | | |
|---|---|---|
| H634 | 6/1989 | Nieri et al. . |
| 718,826 | 1/1903 | Ehrenzeller . |
| 1,473,751 | 11/1923 | Walker . |
| 1,495,011 | 5/1924 | Ford . |
| 3,173,295 | 3/1965 | Magleby ............... 73/201 |
| 3,336,055 | 8/1967 | Pall et al. ............ 285/302 X |
| 4,872,338 | 10/1989 | Rivero-Olmedo . |
| 4,884,442 | 12/1989 | Rivero-Olmedo . |
| 4,932,686 | 6/1990 | Anderson, Jr. ........ 285/302 X |
| 4,993,260 | 2/1991 | Bednarz . |
| 5,003,821 | 4/1991 | Rivero-Olmedo . |

FOREIGN PATENT DOCUMENTS

| | | |
|---|---|---|
| 537976 | 6/1921 | France . |
| 3743170 | 5/1989 | Germany ............. 285/32 |

OTHER PUBLICATIONS

Mueller Co. "Iron Meter Yoke".
Ford Meter Box Company, "Ford Yokes and Yoke Parts", Section E4, May 1987.

*Primary Examiner*—Richard E. Chilcot, Jr.
*Assistant Examiner*—Jewel V. Artis
*Attorney, Agent, or Firm*—Cushman Darby & Cushman

[57] ABSTRACT

A handwheel expansion mechanism including a meter adapter, a handwheel body and an expansion cup. The expansion cup is slidingly engaged with the meter adapter, and the handwheel body is rotationally coupled to the meter adapter. Rotation of the handwheel body cause the handwheel body to create a space between the base of the meter adapter and the handwheel body. At the same time, metal-on-metal contact between the handwheel body and the expansion cup causes the expansion cup to pushed along the meter adapter.

7 Claims, 4 Drawing Sheets

THREE PIECE HANDWHEEL HAVING EXPANSION MECHANISM FOR METER BOX OR METER YOKE

This is a continuation of application Ser. No. 08/037,112, filed on Mar. 25, 1993, now abandoned, which was abandoned upon the filing hereof.

BACKGROUND OF THE INVENTION

1. Field of the Invention

This invention relates to meter yokes and meter boxes. More particularly, this invention relates to an expansion mechanism for mounting fluid meters in meter boxes and meter yokes.

2. Description of Related Art

In known handwheel expansion mechanisms for meter boxes or meter yokes, the handwheel part of the mechanism has a tendency to walk or move in the meter box or meter yoke assembly. In the art, "walking" is caused by relative movement that can take place between the inner and outer members of the handwheel assembly. All prior art known to the present inventor has the problem of "walking".

For example, in U.S. Pat. No. 5,003,821, a two-piece handwheel is disclosed. In this patent, a cup completely covers an O-ring in an O-ring groove provided in the sleeve. The handwheel and cup are integrally formed as a one-piece assembly. Walking occurs between the end of the extension cup of the handwheel assembly and the rubber seal of the meter box or meter yoke during installation of the handwheel. Rotation of the extension cup and the handwheel together causes the end of the extension cup to move (walk) upward on the flat rubber seal. Misalignment between the flow way of the expansion mechanism and the bore of the sealing gasket centered with the flow way of a meter valve or fitting is caused by 'walking'.

FIGS. 5 and 6 illustrate another prior art design. FIG. 5 depicts the assembled design while FIG. 6 shows an exploded view of the prior art model. Handwheel assembly 100 includes body 102, handwheel 104, gasket/O-ring 106 and extension cup 108. Gasket or O-ring 106 is provided at the base of extension cup 108. Thus, there is no metal-on-metal contact between the handwheel body 104 and the extension cup 108. Rather, there is a metal-on-rubber-on metal contact between handwheel body 104, O-ring 106 and extension cup 108. When the gasket or ring seal is compressed, the fluid pressure will be transmitted by means of the compressed gasket to the lower end of the inner member to cause relative movement with respect to the handwheel. That is, the handwheel assembly tends to be pushed radially when the extension cup has its distal surface pressed in place. It is believed that the walking is caused by gasket 106, which under load, tends to act as a coupling between the end piece 108 and handwheel 104 under installation loading. Friction between the rubber gasket and metal parts allows rotation of the end piece 108 on the sealing gasket and therefore 'walking'. Furthermore, because the gasket or O-ring is not completely contained at its outer diameter, it can creep outward and thus reduce the sealing force. Walking, which allows flow way misalignment, occurs with the handwheel expansion mechanism 10 in the expanded position, as arms 103a and 103b are rotated. The design depicted in FIG. 5 has a reduced flow diameter. For a ⅜ inch handwheel assembly, the flow diameter is 0.594 inches.

SUMMARY OF THE INVENTION

The object of the present invention is to reduce 'walking' of the handwheel assembly and therefore reduce flow way misalignment. This is done by having the extension cup contact the handwheel body in metal-on-metal, point to point relation. The handwheel generally includes three pieces, a meter adapter, a handwheel body, and an extension cup. The fitting between the cup and handwheel is metal-to-metal. However, the cup is not integrally engaged with the meter adapter. Rather, the cup is slidingly engaged with the meter adapter without rotation. Only an O-ring disposed on the adapter provides any type of friction between the cup and the adapter.

The cup is made so as to fit snugly over the O-ring. That is, there is such friction between the cup and the adapter caused by the O-ring to maintain the cup in position without movement.

The present invention is thus directed to an expansion mechanism for use with a meter box and meter yoke. The expansion mechanism is a meter adapter having a first section with a first diameter and a second section with a second diameter that is less than the first diameter. The second section extends from the first section and includes a distal end with friction means disposed thereon. The mechanism further includes a handwheel with an annular body defining a first opening and a second opening. The annular body is rotationally, operatively coupled to the first section of the meter adapter, with said second opening having a diameter such that said second section can protrude therethrough. The second opening of the handwheel is joined to walls of the annular body via a substantially flat top surface. An extension cup is slidingly, frictionally engaged with the second section of the meter adapter, the extension cup being held on the second section via the friction means. Rotation of the handwheel body causes the extension cup to slide without rotation towards the distal end of the second section due to a force exerted on the second section via the substantially flat top surface of the handwheel body.

BRIEF DESCRIPTION OF THE DRAWINGS

Other objects, features and characteristics of the present invention, as well as the methods, operation and function of related elements of the structure, will become apparent upon consideration of the following description and the appended claims with reference to the drawings, all of which form a part of this specification, wherein like reference numerals designate corresponding parts in the various figures. In the drawings:

FIG. 1A is a cross sectional view of the assembled handwheel mechanism depicted in FIG. 1;

DETAILED DESCRIPTION OF THE PRESENTLY PREFERRED EXEMPLARY EMBODIMENT

Figure 1:
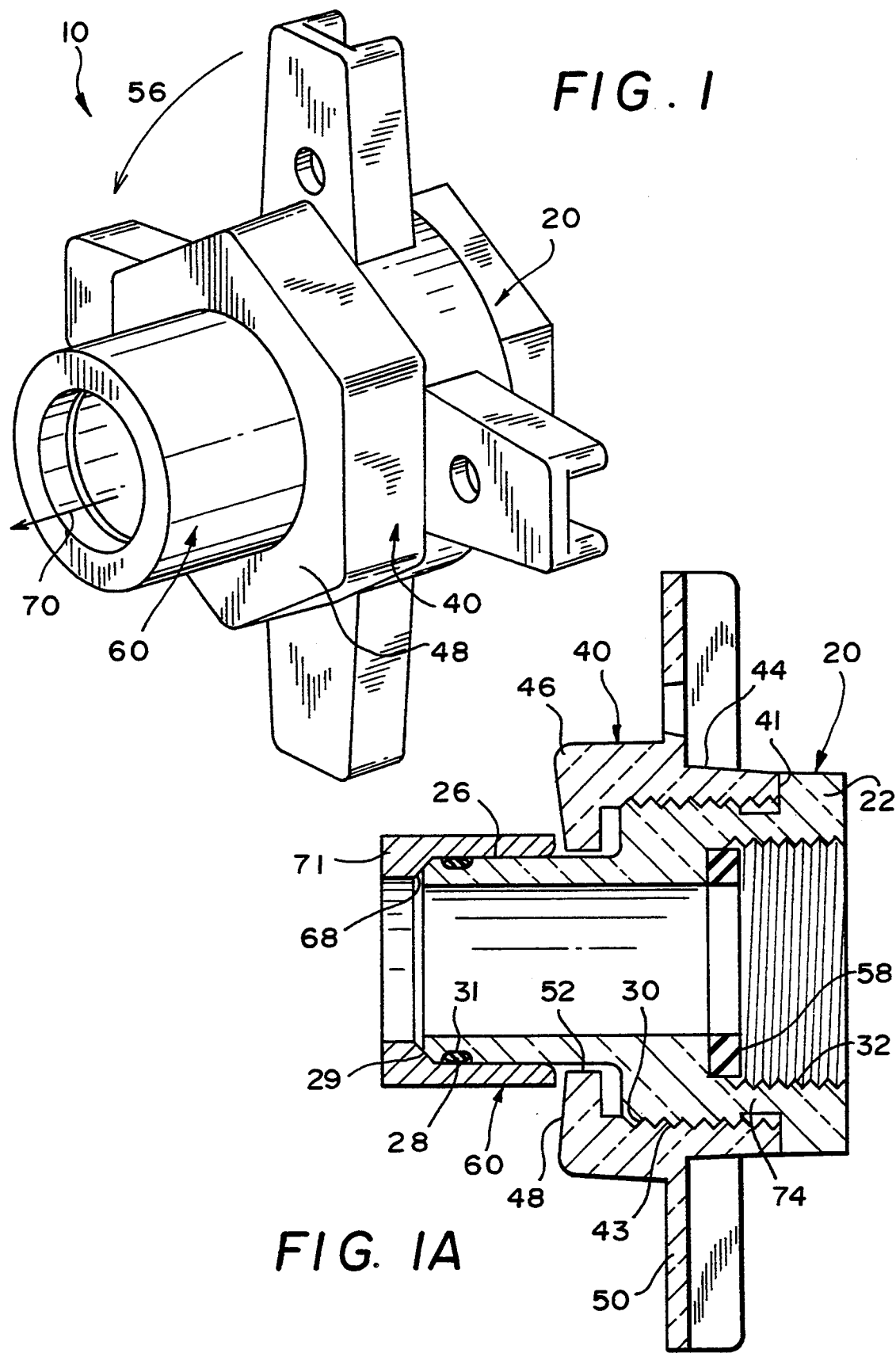
FIG. 1 is a view showing the three piece handwheel according to the present invention in an assembled position.
Figure 2:
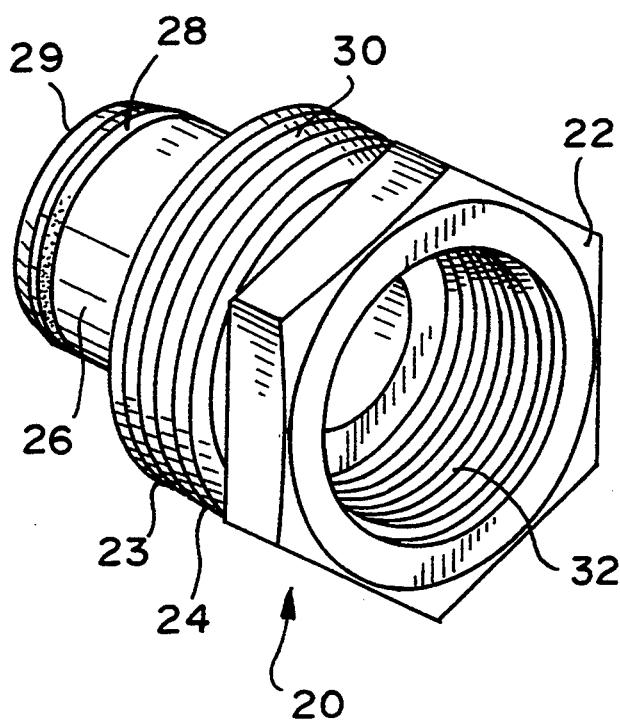
FIG. 2 is a view of the meter adapter to which the handwheel body and extension cup attach.
Figure 3:
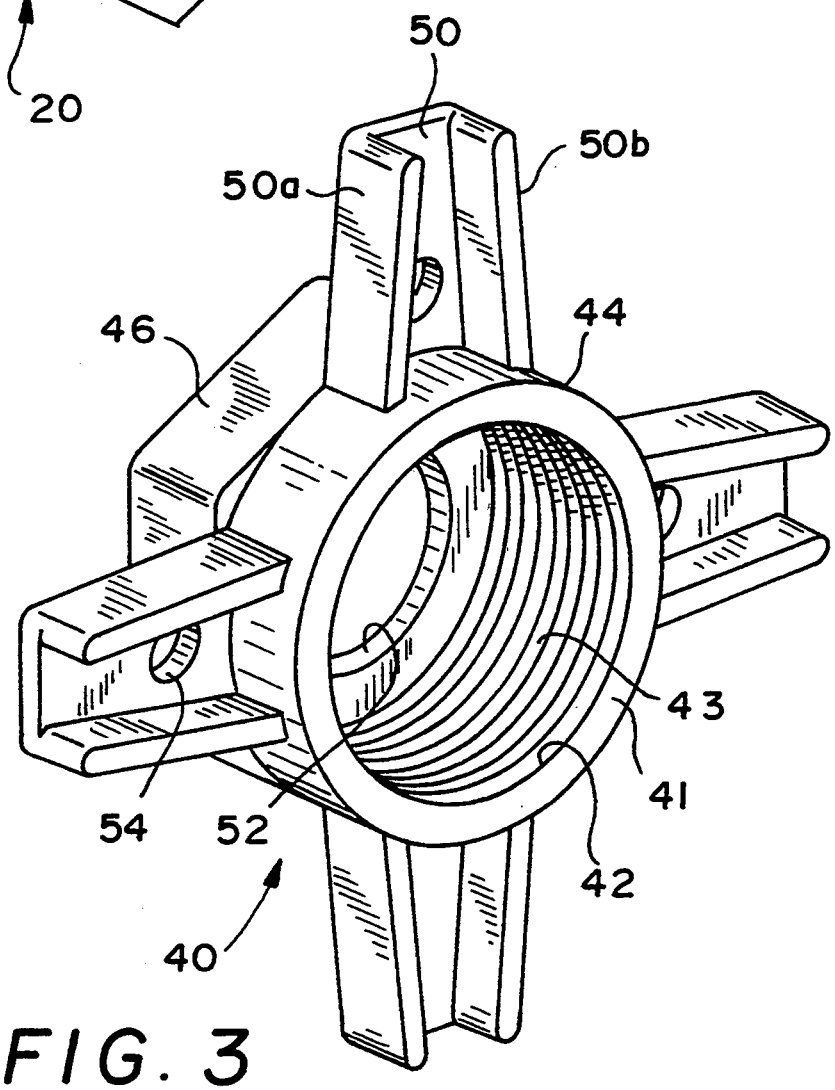
FIG. 3 illustrates the handwheel body that attaches to the meter adapter depicted in FIG. 2.
Figure 4:
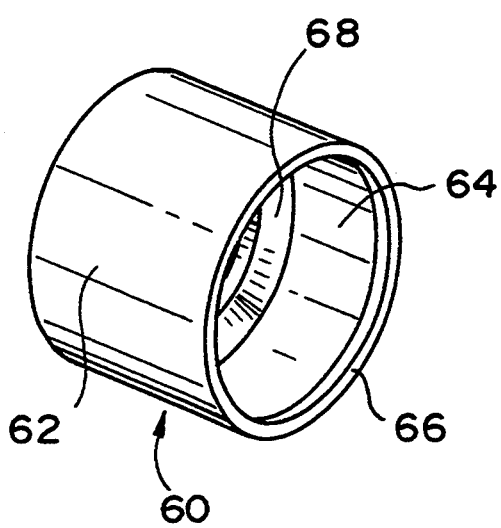
FIG. 4 depicts the extension cup that is slidably coupled to the meter adapter shown in FIG. 2.
Figure 5:
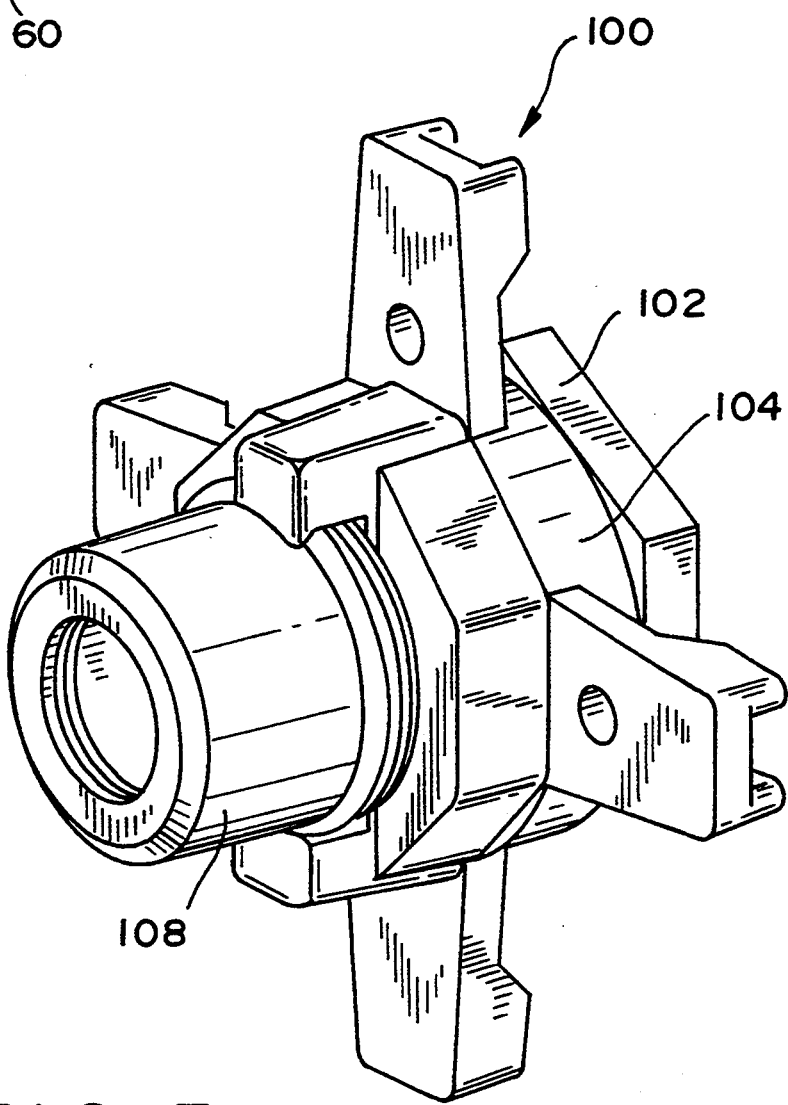
FIG. 5 shows a prior art model of a handwheel assembly.
Figure 6:
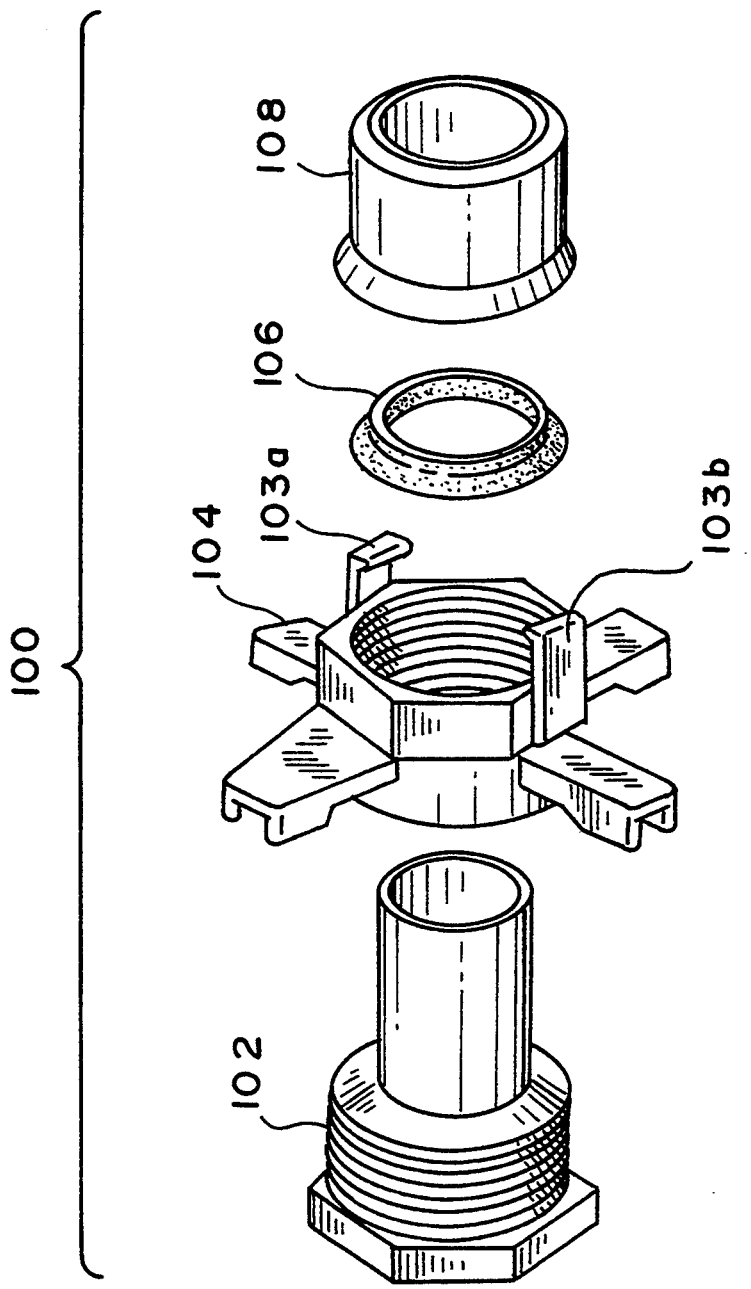
FIG. 6 is an exploded view of the prior art handwheel assembly shown in FIG. 5.

The present invention will now be described in detail with reference to FIGS. 1-4. FIGS. 1 and 1A depict the handwheel assembly according to the present invention, which includes three parts which are operatively assembled as shown in FIG. 1A. Handwheel assembly 10 includes a meter adapter 20, a handwheel body 40 and an extension cup 60. Handwheel body 40 is rotationally coupled to meter adapter 20 as will be described below, while extension cup 60 is slidably engaged with meter adapter 20. Preferably, all parts for handwheel assembly 10 are machined from a metal, which will not easily corrode, such as copper or brass.

Meter adapter 20 (FIG. 2) includes first section 24 and a second section 26. Both first section 24 and second section 26 are cylindrical in shape. First section 24 has a larger diameter than second section 26. First section 24 includes annular body 23 and base 22. Base 22 is preferably hexagonal in its outer shape so as to facilitate the threaded attachment to a meter (not shown) via interior threads 32. To provide an air-tight seal when a meter is attached to meter adapter 20, gasket 58 is provided at the inner end of threads 32, as depicted in FIG. 1A. Annular body 23 of first section 24 includes threads 30, which facilitate the attachment of handwheel body 40 to meter adapter 20.

As noted above, second section 26 extends from first section 24, and has a diameter smaller than that of first section 24. Second section 26 has a friction member disposed at its distal end. The friction member is preferably an O-ring 28 disposed in a groove 31 (FIG. 1A). The friction member provides a frictional force between extension cup 60 and meter adapter 20 so that extension cup 60 will be slidably, frictionally engaged with second section 26. Lip 68 of extension cup 60 contacts distal surface 29 of second section 26. Preferably, the outer annular wall of second section 26 is smooth, so that no metal-on-metal contact occurs that causes enough friction to retain extension cup 60.

Handwheel body 40 (FIG. 3) includes annular body 44 defining first opening 42. The interior surface of annular body 44 has threads 43 disposed thereon. Threads 43 cooperate with threads 30 when handwheel body 40 is joined to meter adapter 20. Lower rim 41 of annular body 44 comes into contact with base 22 when handwheel body 40 is joined with meter adapter 20.

Handwheel body 40 includes projections 50 extending radially therefrom. Projections 50 are formed as channels, with each projection 50 having side surfaces 50a and 50b. Such a design provides strong resistance against bending when the expansion mechanism is mounted in place. Preferably, there are four projections 50 with three having holes 54 formed therein so that wires (not shown) may secure the handwheel assembly to a stationary object proximate the handwheel assembly 10.

At the side of annular body 44 opposite rim 41, upper hexagonal section 46 is formed, which includes a substantially flat contact wall 48 including second opening 52. It is possible that contact wall 48 may have a small indentation, or be sloped toward second opening 52. The invention includes such a configuration. When contact wall 48 does slope toward second opening 52, bottom surface 66 of extension cup 60 does not necessarily fit flush with contact surface 48. Rather, bottom surface 66 contacts the contact surface 48 along only an annular section of surface 66. When handwheel body 40 and meter adapter 20 are joined together, second section 26 of meter adapter 20 protrudes through second opening 52. Second opening 52 is just large enough to allow second section 26 to pass therethrough without contact between contact wall 48 and second section 26.

Extension cup 60 (FIG. 4) slidingly engages with second section 26, as described above, and is held in position by friction member 28. Inner annular wall 64 is large enough to just fit over second section 26 without friction, but the diameter of inner annular wall is such that contact occurs between friction member 28 and inner annular wall 64 such that a frictional force is generated that is sufficient to hold the extension cup at any position where contact occurs between friction member 28 and inner annular wall 64. Outer annular wall of extension cup 60 is also smooth. The extension cup 60 has an inner diameter substantially equal to a diameter of the opening 52.

Extension cup 60 further includes a bottom surface 66, which comes into contact with contact surface 48 when cup 60 is engaged with second section 26 (such a configuration is depicted in FIG. 1). The inner diameter of extension cup 60 is approximately equal to the diameter of second opening 52. Further, extension cup 60 is provided with lip 68 that comes into contact with distal surface 29 of second portion 26 during expansion to move extension cup 60.

To expand the three-piece handwheel assembly 10, handwheel body 40 is rotated counterclockwise so that threads 43 of handwheel body 40 disengage from threads 30 of meter adapter 20. The direction of rotation of handwheel body 40 is indicated by arrow 56 in FIG. 1. As handwheel body 40 is rotated, the space between handwheel body 40 and base 22 increases from approximately zero to greater than one centimeter if necessary. However, generally the necessary gap is only on the order of several millimeters. It is unusual for handwheel body to be rotated more than two or three turns to expand the handwheel mechanism 10 into the sealing gasket (not shown) to create a seal.

As the gap between handwheel body 40 and base 22 of meter adapter 20 is increased, contact wall 48 of upper hexagonal section 46 pushes against bottom surface 66 of extension cup 60, thereby pushing extension cup 60 in the direction indicated by arrow 70 in FIG. 1. Inner surface 64 of extension cup 60 moves with respect to second section 26. At all times, friction member 28 is in contact with inner surface 64, thereby keeping extension cup 60 in a steady position with respect to second section 26. Due to the low amount of friction between handwheel body 40 and extension cup 60 as handwheel body 40 is rotated, misalignment due to walking does not occur in the present invention as in the prior art when outer end 71 is compressed against a yoke seal (not shown). This occurs because extension cup 60 does not rotate to cause 'walking', during the advancement of the cup, to create a seal.

When the handwheel expansion mechanism is assembled with a meter and pipe, the flow diameter of the present invention is larger than that achieved in the prior art. Particularly, the flow diameter is 0.628 inches for a ⅝ inch handwheel. Thus, besides eliminating walking from the handwheel mechanism, flow therethrough is improved.

While the invention has been described in connection with what is presently considered to be the most practical and preferred embodiment, it is to be understood that the invention is not to be limited to the disclosed embodiment, but is intended to cover various modifications and equivalent arrangements within the spirit and scope of the appended claims.

We claim:

1. An expansion mechanism for use in a meter box or meter yoke, said expansion mechanism comprising:
   a body including a first section having a first diameter and a second section having a second diameter being less than said first diameter, said second section extending from said first section and having a distal end, said second section having friction means disposed thereon;
   a rotating means including an annular body defining a first opening and a second opening, said annular body being rotationally, operatively coupled to the first section of said body, with said second opening allowing said second section to protrude therethrough, said annular body being rotatable on said body in an advancing direction and in an opposite direction, said second opening being joined to walls of said annular body via a substantially flat top surface; and
   an extension cup slidingly engaged with said second section, said extension cup being held on said second section by cooperation with said friction means, said extension cup contacting said rotating means only at an exterior surface of said substantially flat top surface and being slidable along said second section via a pushing force caused by rotation of said annular body in said advancing direction;
   wherein rotation of said annular body to expand said mechanism causes said extension cup to slide, without rotation, towards the distal end of said second section due to a force exerted on said cup by said substantially flat top surface, said first section of said body being threadingly coupled to said annular body and said friction means being disposed at said distal end of said second section.

2. An expansion mechanism as claimed in claim 1, wherein said first section of said body is threadingly coupled to said annular body.

3. An expansion mechanism as claimed in claim 1, wherein said friction means is disposed at said distal end of said second section.

4. An expansion mechanism as claimed in claim 1, wherein said friction means is an O-ring disposed in a groove formed in said second section.

5. An expansion mechanism as claimed in claim 1, wherein said extension cup has an inner diameter substantially equal to a diameter of said second opening.

6. An expansion mechanism as claimed in claim 1, wherein said body further includes a plurality of extensions radially extending from an exterior surface of said annular body.

7. An expansion mechanism as claimed in claim 6, wherein said body includes four radially extending extensions.

* * * * *